(12) United States Patent
Mastenbrook et al.

(10) Patent No.: US 12,492,933 B2
(45) Date of Patent: Dec. 9, 2025

(54) FLOOR SCALE WITH CLEANABLE FOOTPRINT

(71) Applicant: Mettler-Toledo, LLC, Columbus, OH (US)

(72) Inventors: Joshua Mastenbrook, Lancaster, OH (US); Jason Bayer, Columbus, OH (US); Huaqiang Hui, Changzhou (CN); Thomas Johannes Schilling, Albstadt (DE); Dengyou Chen, Changzhou (CN)

(73) Assignee: Mettler-Toledo, LLC, Columbus, OH (US)

( * ) Notice: Subject to any disclaimer, the term of this patent is extended or adjusted under 35 U.S.C. 154(b) by 560 days.

(21) Appl. No.: 17/950,220

(22) Filed: Sep. 22, 2022

(65) Prior Publication Data

US 2024/0102848 A1 Mar. 28, 2024

(51) Int. Cl.
    *G01G 21/28*     (2006.01)
    *G01G 21/22*     (2006.01)

(52) U.S. Cl.
    CPC ............. *G01G 21/28* (2013.01); *G01G 21/22* (2013.01)

(58) Field of Classification Search
    CPC ......... G01G 19/02; G01G 21/28; G01G 21/22
    USPC ......................................................... 177/126
    See application file for complete search history.

(56) References Cited

U.S. PATENT DOCUMENTS

| | | | |
|---|---|---|---|
| 4,789,194 A | 12/1988 | Watson | |
| 4,881,607 A * | 11/1989 | Backu | G01G 21/24 |
| | | | 177/256 |
| 5,359,153 A | 10/1994 | Herrmann et al. | |
| 5,637,837 A * | 6/1997 | Merz | G01G 21/22 |
| | | | 298/17 B |
| 8,461,466 B2 | 6/2013 | Sagarsee et al. | |
| 9,149,131 B2 | 10/2015 | Taylor et al. | |
| 9,750,323 B2 | 9/2017 | Berger | |
| 10,179,711 B1 | 1/2019 | Moore | |

(Continued)

FOREIGN PATENT DOCUMENTS

| | | |
|---|---|---|
| CN | 103630225 A | 3/2014 |
| CN | 203534683 U | 4/2014 |

(Continued)

OTHER PUBLICATIONS

NPL*

*Primary Examiner* — Peter J Macchiarolo
*Assistant Examiner* — Mireille S Sadate-Moualeu
(74) *Attorney, Agent, or Firm* — Standley Law Group LLP; Jeffrey S. Standley; Adam J. Smith

(57) ABSTRACT

A floor scale (10) intended for use in an environment requiring hygienic cleaning has a load platform (12) that is supported by a frame (18). A pair of foot assemblies 26, positioned along the sides of the frame, anchor the frame to the floor and provide a base from which the frame and load platform may be pivoted about an axis (A) between an operative position in which an upper surface (14) of the load platform is substantially parallel to the floor and a non-operative position in which the upper surface is angled obliquely relative to the floor. In the non-operative position, a footprint (F) of the floor scale is accessible for cleaning, Structural members of the frame and foot assemblies are substantially devoid of horizontal concave surfaces in which liquids could pool. Locking means is provided for the operative position and at least one non-operative position.

18 Claims, 7 Drawing Sheets

(56) References Cited

U.S. PATENT DOCUMENTS

| | | |
|---|---|---|
| 10,443,644 B2 | 10/2019 | Hennon |
| 2015/0308886 A1 | 10/2015 | Shinozaki et al. |
| 2021/0131859 A1 | 5/2021 | Schmidt et al. |

FOREIGN PATENT DOCUMENTS

| | | | |
|---|---|---|---|
| CN | 106768250 A | 5/2017 | |
| CN | 206348063 U | 7/2017 | |
| CN | 108051058 A | 5/2018 | |
| CN | 209446147 U | 9/2019 | |
| CN | 210242938 U | 4/2020 | |
| DE | 4124039 A1 | 1/1992 | |
| DE | 10038443 A1 * | 2/2002 | ............. G01G 21/22 |
| DE | 20210651 U1 * | 11/2003 | ........... B62B 3/0606 |
| DE | 102008062249 B4 | 8/2013 | |
| DE | 202016102409 U1 * | 10/2017 | |
| DE | 102016117539 A1 | 3/2018 | |
| DE | 102017130305 A1 * | 6/2019 | ............. G01G 21/28 |
| DE | 102017130305 B4 * | 2/2021 | ............. G01G 21/28 |
| EP | 2631615 A1 | 8/2013 | |
| FR | 2683194 A1 * | 5/1993 | ........... B60P 1/4414 |
| JP | 2009-25256 A | 2/2009 | |

* cited by examiner

FLOOR SCALE WITH CLEANABLE FOOTPRINT

CROSS-REFERENCE TO RELATED APPLICATIONS

This patent application is a non-provisional application under 35 USC 111(a) that makes no claim of priority.

TECHNICAL FIELD

The present invention relates to the field of weighing and particular to floor-based scales that are used in processing environments where access to the surfaces of the floor scale and its surroundings for cleaning is critical. The weight, geometry and proximity to the ground of a floor scale have rendered hygienic cleaning of such devices difficult, and, in some instances, unsafe, especially when access to the footprint below the scale is required. The disclosed invention is directed to providing a floor scale with surfaces and surroundings that may be safely and effectively accessed without adversely affecting the ability to accurately and reliably perform the weighing task.

BACKGROUND ART

A number of types of heavy-duty scales are used in industrial weighing. In some situations, the scale can be a portable scale, having casters or similar means that facilitates moving the scale to a point of use, but this mobility generally comes at the price of raising the weighing surface. In another situation, a portable scale uses a forked load platform in the nature of a pallet jack. Such a scale may be useful, but only when the target load is already on a pallet. As the mass and volume of the target load increases, the required load platform increases in both footprint area and in thickness. The load platform needs to be arranged in a structure proximate to a floor, with the structure providing a base for the plurality of load cells on which the load platform bears. In many of these situations, the structure is mounted to the floor for stability. This is the weighing system referred to in this application as a floor scale.

In some industries, the environment in which the floor scale is used does not require frequent "wash down" or "wipe down" cleaning. However, there are a number of industries where cleanliness is paramount. Recent concerns with surface transmission during the early days of the coronavirus accentuated the known concerns about sanitation, decontamination and avoidance of cross contamination. For purpose of illustration only, such industries include food processing, pharma and bio processing.

At least one piece of prior art, U.S. Pat. No. 5,359,153, is directed at a portable, clean-in-place industrial floor scale. However, the approach taken there is to reduce the weight of the load platform. While this may make the load platform lighter, it also reduces the maximum capacity of the scale.

Besides cleaning the top of the load platform and the surrounding structure, there is a need to be able to safely raise the load platform from its horizontal operating position to clean the footprint on which it is mounted. It may also be necessary to minimize the amount of surface where liquids may pool and present a growth medium for bacteria and the like.

It is an unmet object of the prior art to meet these requirements.

SUMMARY OF THE INVENTION

These objects are met by a floor scale having the inventive concept embodied therein. Such a floor scale is configured to allow cleaning of both the floor scale and a footprint of the floor scale on a floor on which the floor scale is arranged. The floor scale comprises a load platform having an upper surface for receiving a load to be weighed, a frame supporting the load platform above the floor and a pair of foot assemblies, each of which is connected to the frame for pivoting the load platform about an axis between an operative position in which the upper surface is substantially parallel to the floor and a non-operative position in which the upper surface is angled obliquely relative to the floor.

In such a floor scale, the load platform is preferably rectangular, and, more preferably, square. In such a floor scale, the load platform is a rectangular solid wherein the upper surface typically has an area of from about 400 to about 5000 $in^2$ and the load platform typically weighs from about 120 to about 600 lb.

In many embodiments, the frame comprises a front frame member, a rear frame member, and a pair of side frame members, each of which is attached to the respective front and rear frame members to define a rectangular frame having front, rear and side edges and four corners. The frame also has a plate, at a lower portion of each of the four corners. The load platform bears upon these plates, with an aperture in each establishing a force communication with the floor only when the load platform is in the operative position. The front and rear frame members comprise cylindrical bars and the side frame members comprise cylindrical bars and vertical plates, thereby minimizing concave horizontal surfaces that would allow accumulation of liquids.

In many embodiments, the foot assemblies comprise a first foot, connected to the frame near the rear edge of the frame, establishing the axis for pivoting the frame, a second foot, spaced apart from the first foot, and a cylindrical bar, offset from the floor and parallel to the side edge of the frame, holding the first foot and second foot in spaced-apart relationship. Each first foot and second foot is adapted to be anchored to the floor by a means for fastening.

In many embodiments, for each of the floor assemblies, the second foot and the corresponding side frame member provide anchor points for applying torque to the frame above the axis.

Many embodiments of the floor scale further comprise a means for locking the load platform in the operative position and in at least one non-operative position. IN such embodiments, the means for locking may comprise a spring-loaded locking pin arranged in the first foot; and at least two apertures in the corresponding side frame member, the first of the apertures positioned to receive the locking pin when the load platform is in the operative position and each of the further apertures positioned to receive the locking pin when the load platform is in one of the at least one non-operative positions.

Many embodiments may further comprise, for each floor assembly, a hydraulic cylinder having a first end mounted to the second foot and a second end mounted to the corresponding side frame member. In such an embodiment, a rod/piston of the hydraulic cylinder is in a retracted position when the load platform is in the operative position and in an extended position when the load platform is in the non-operative position. In many of the embodiments, a cylinder body of the hydraulic cylinder is mounted to the second foot.

In the embodiments all surfaces of the frame and foot assemblies are substantially devoid of concave horizontal surfaces.

BRIEF DESCRIPTION OF THE DRAWINGS

The above and other features, properties and advantages of the present invention will become clearer based on the description below in conjunction with the accompanying drawings and embodiments, and the same features are always indicated by the same reference numerals in the figures, in which.

DETAILED DESCRIPTION OF EMBODIMENTS

Figure 1A:
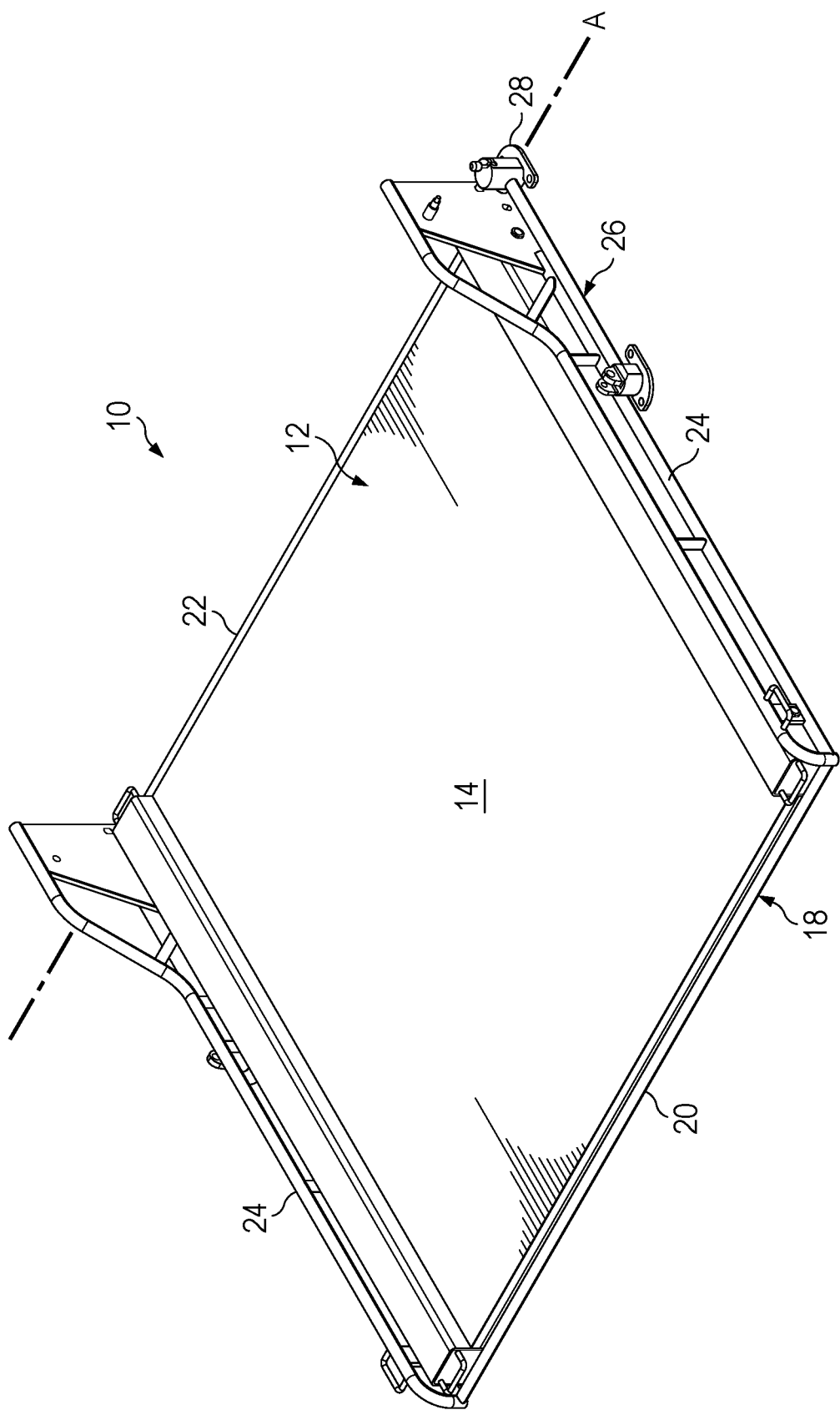
FIGS. 1A and 1B are perspective views of an embodiment of the floor scale having the inventive concept, with FIG. 1A showing the embodiment in an operative position and FIG. 1B showing the embodiment in a raised position.
Figure 1B:
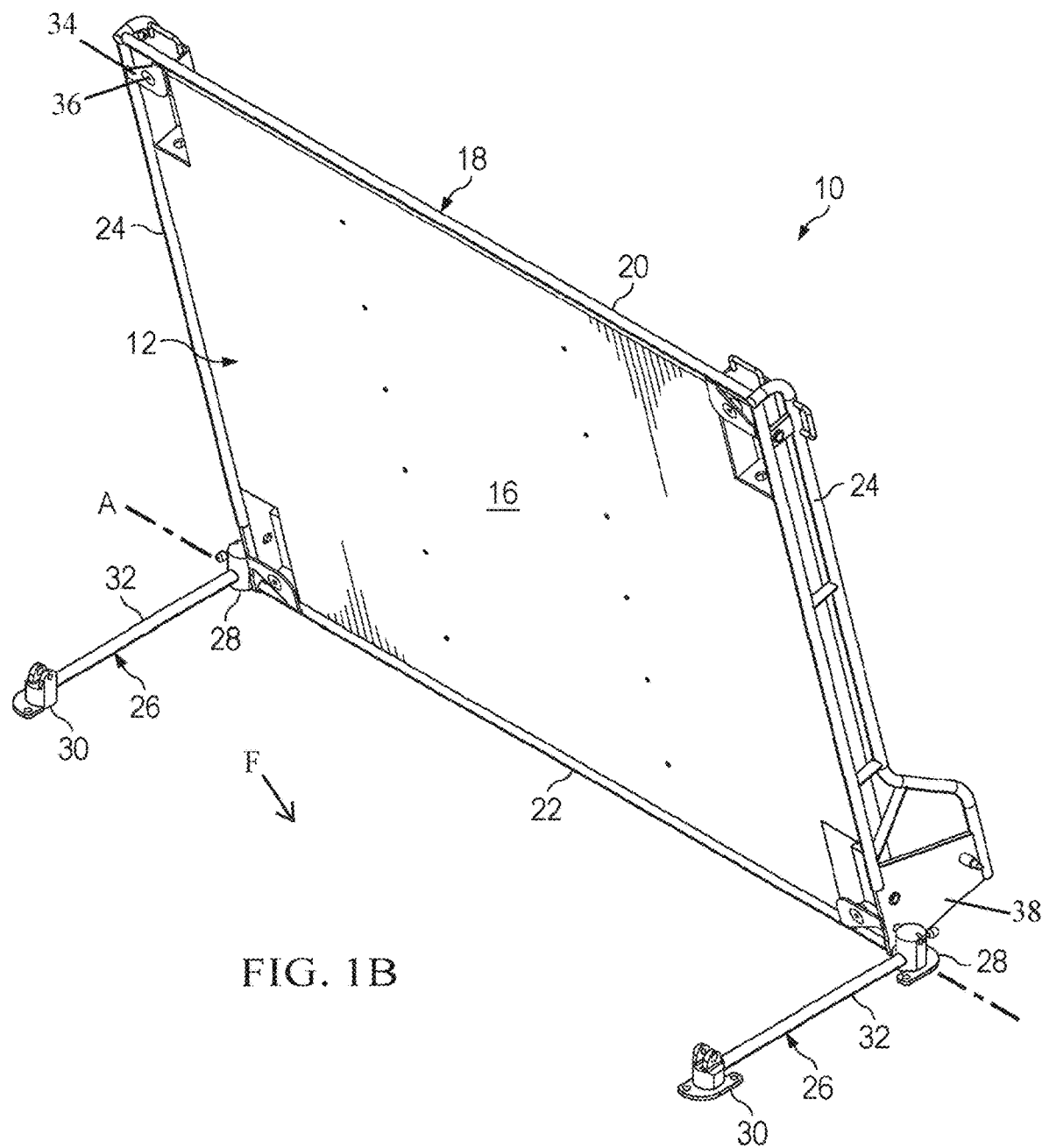

An embodiment of a floor scale 10 incorporating the inventive concept is depicted in perspective views in FIGS. 1A and 1B. The floor scale 10 is particularly configured to allow the cleaning of both the floor scale and a footprint F of the floor scale on the floor beneath floor scale. In FIG. 1A, the footprint is not visible, as the floor scale 10 is shown in an operative condition, in which a load platform 12 of the floor scale is positioned substantially horizontally for receiving a load to be weighed. In FIG. 1B, the load platform 12 is in a raised non-operative condition that provides access to many of the surfaces of the floor scale 10, as well as to the floor or base surface on which the floor scale is placed, particularly the footprint F beneath the load platform. For purposes of this specification, the footprint F refers to the portion of the floor that is beneath the load platform 12 when in the operative condition.

The load platform 12 is a vital aspect of the floor scale 10, depicted in all views, but not readily apparent in some of the views. The load platform 12 in a typical floor scale 10 will be a rectangular metal plate, preferably a square plate. In a typical embodiment, an upper surface 14 of the load platform 12 will be planar, as seen in FIG. 1A, to facilitate positioning of a load being weighed by the floor scale 10. Load platform 12 also has a lower surface 16, visible in FIG. 1B. The surface area of the upper surface 14 and the weight of the load platform 12 can widely vary, but the issues being solved by the inventive concept come into play when the load platform becomes so large or so heavy that moving it to obtain access to the footprint becomes unwieldy or unsafe. Based on that, a typical range for the surface area where the inventive concept would be employed would be from about 400 $in^2$ to about 5000 $in^2$. If such a load platform 12 is a solid metal plate, a reasonable weight range would then be typically in the range of from about 120 to about 600 lb. Alternate solutions exist for providing cleaning access to a floor scale 10 when the load platform 12 is significantly outside those ranges, although the inventive concept is by no means limited to the surface area and weight ranges.

Although subsequent figures will describe the features of the inventive concept in more detail, FIGS. 1A and 1B clearly demonstrate the movement of the load platform 12 as it is moved from the operative position of weighing a load (FIG. 1A) to a raised, non-operative position (FIG. 1B) in which the footprint F is accessible for cleaning. A periphery of the load platform 12 is surrounded by a frame 18 that supports the load platform when the load platform is being raised or lowered or is in the non-operative position. When in the operative position, the load platform 12 is maintained above the floor, but load cells are interposed between the load platform and the floor. The movement from the operative position to the non-operative position, shown in FIGS. 1A and 1B, is a pivoting movement about an axis A established at a rear portion of the floor scale 10.

Additional features of the frame 18 that are visible in FIGS. 1A and 1B include a front frame member 20, a rear frame member 22 and a pair of side frame members 24.

The floor scale 10 also has a pair of foot assemblies 26, each of which is connected to the frame 18 for pivoting the load platform 12 about an axis A at a rear portion of the frame. The foot assemblies 26 are not very distinguishable from the frame 18 in FIG. 1A, but they are quite clearly seen once the load platform 12 is in the raised, non-operative position of FIG. 1B. Each foot assembly 26 comprises a first foot 28, connected to the frame 18 near the rear edge of the frame, establishing the axis A for pivoting the frame, a second foot 30, and a cylindrical bar 32. The first foot 28 and the second foot 30 are spaced apart from each other and held in that relationship by the cylindrical bar 32. Further, each of the feet 28, 30 are preferably adapted to be anchored to the floor by an appropriate means for anchoring, such as a threaded bolt. The cylindrical bar 32 is offset from the floor and is parallel to one of the side frame members 24 when the load platform 10 is in the operative position. By offsetting the bar 32 and making it cylindrical, the surfaces of it are accessible for cleaning and by having no horizontal concave surfaces, there is little or no ability for liquids to pool. Minimizing exposed horizontal concave surfaces is considered a feature of the inventive concept. Although described as a "bar," cylindrical bar 32 can be a tubular element and still perform its intended function.

Figure 2A:
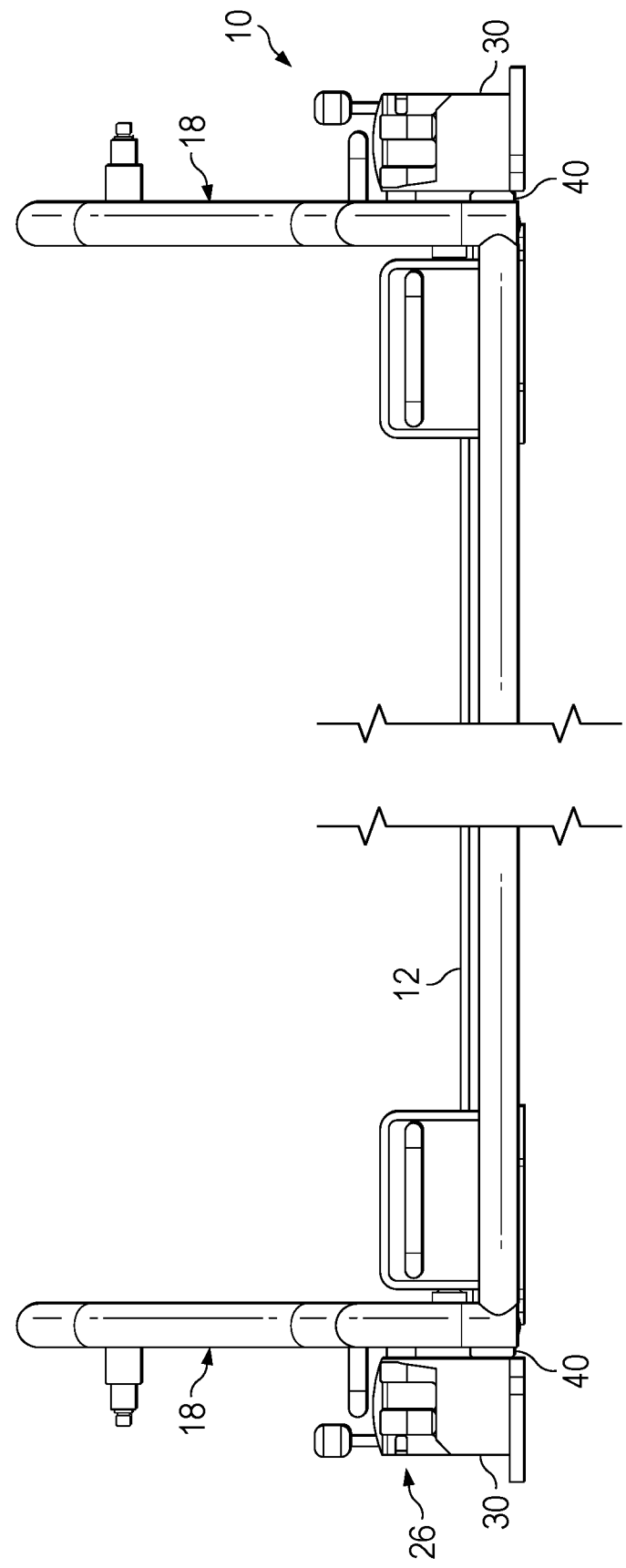
FIGS. 2A and 2B are front elevation views of the floor scale of FIGS. 1A and 1B, with FIG. 2A showing the floor scale in the operative position and FIG. 2B showing the floor scale in the raised position, with a central portion of the width removed.
Figure 2B:
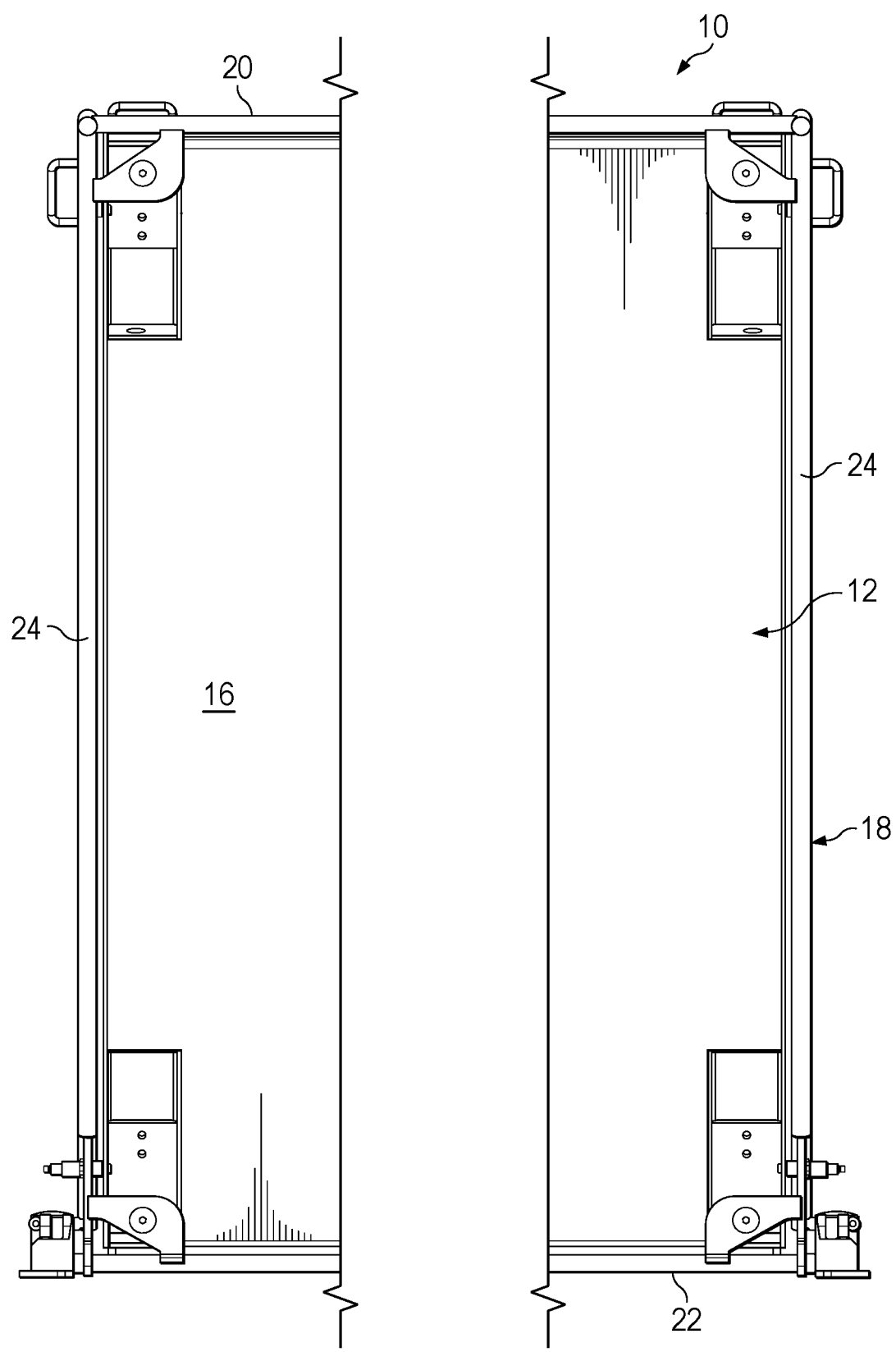
Figure 3A:
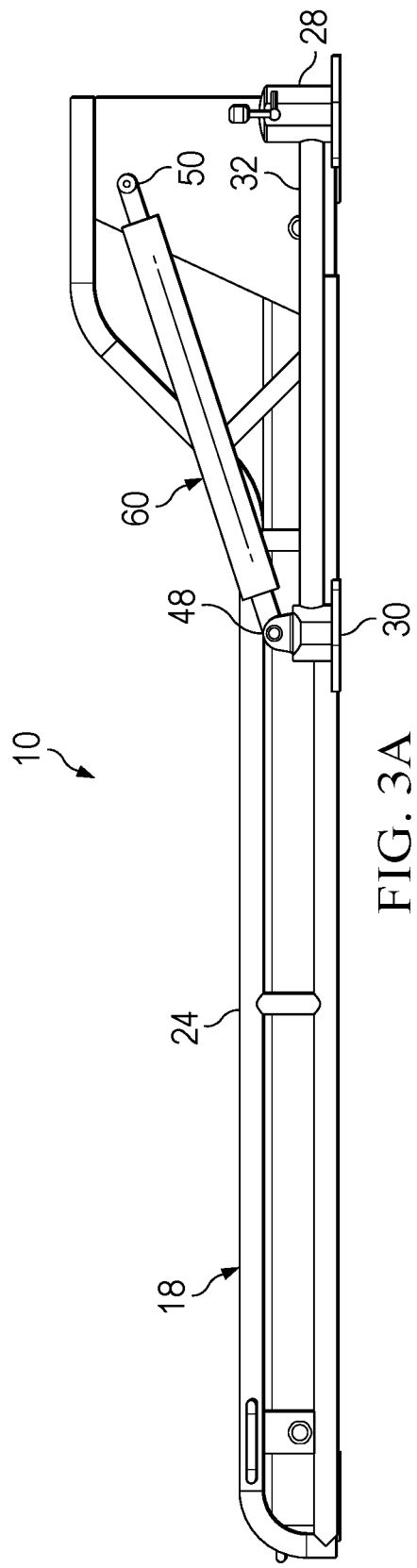
FIGS. 3A and 3B are right-side elevation views of the floor scale, with FIG. 3A showing the floor scale in the operative position and FIG. 2B showing the floor scale in the raised position.
Figure 3B:
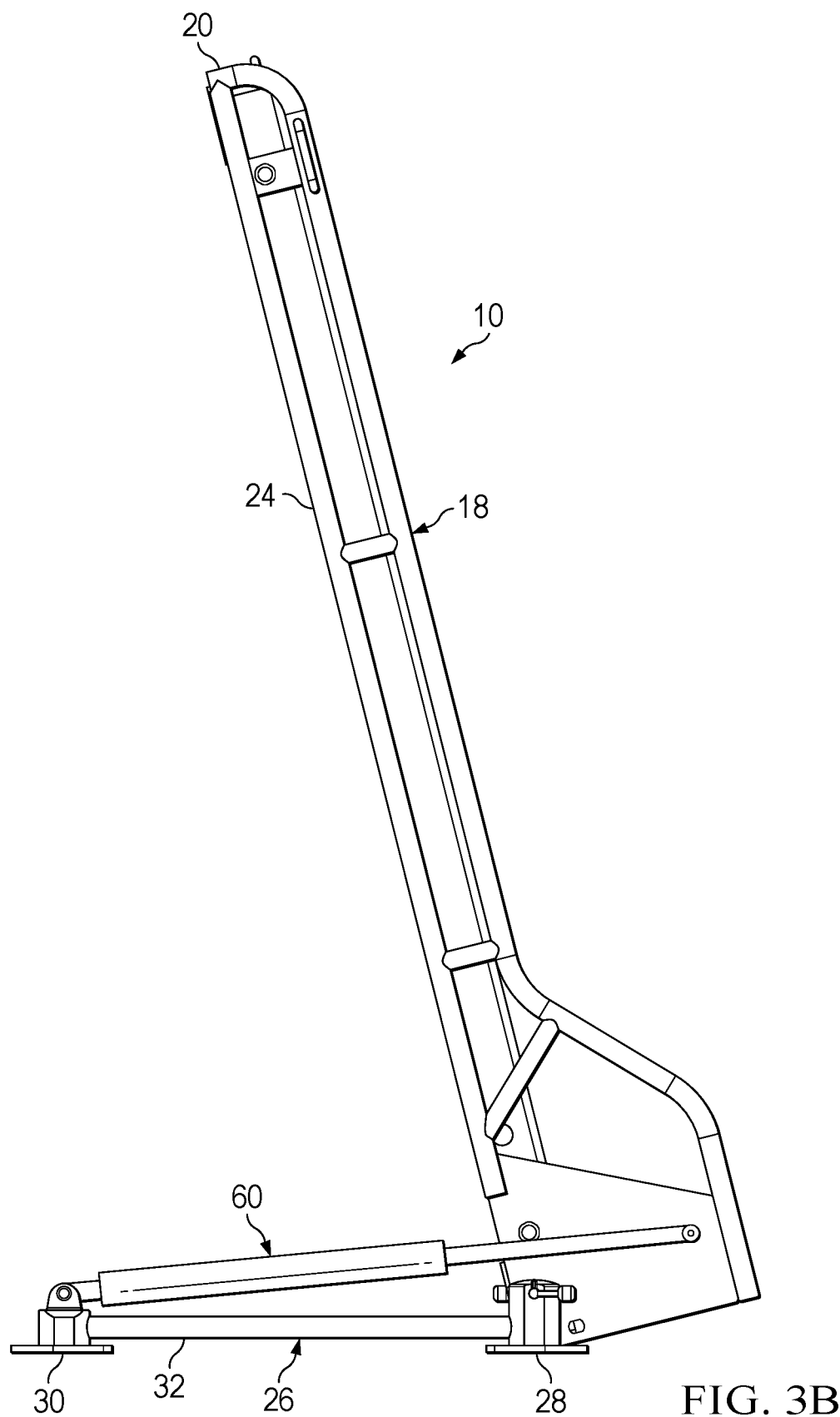

Moving now to FIGS. 2A and 2B, front elevation views of the floor scale 10 are shown. FIG. 2A shows the floor scale 10 in the operative position; FIG. 2B shows the floor scale in the raised position. Because a central portion of the width lacks any characterizing features, a portion of the width is not shown. FIGS. 3A and 3B are right-side elevation views of the floor scale, with FIG. 3A showing the floor scale 10 in the operative position and FIG. 3B showing the floor scale in the raised position. In the embodiment presented, floor scale 10 has side frame members 24 that extend in the front-to-rear dimension more than twice the separation of the first foot 28 from the second foot 30 in the same direction. As seen in FIG. 3B, this particular embodiment will position a vertical projection of the center of mass borne by the frame 18 within the front-to-rear length of each foot assembly 26. However, a more important characteristic of each foot assembly 26 is providing a secure purchase of the floor through a means for anchoring, especially a robust fastener. This characteristic is balanced with the additional concern in minimizing the front-to-rear length of the foot assembly 26, as it can present a tripping hazard when the floor scale 10 is in the raised position.

Although shown to some extent in FIG. 1B, FIG. 2B provides additional insight to the structure of the frame 18 provided by the respective frame members 20, 22, 24. Each side frame member 24 is attached to the respective front and rear frame members 20, 22. The respective attachments may be preferred to be made by welding. When assembled, the frame 18 surrounds a periphery of the load platform 12, so the frame is rectangular, and preferably square, just as at the load platform is. As seen to a certain extent in FIG. 1B, but even better in FIG. 2B, each of the corners of the frame 18 has a plate 34 intended for receiving the weight of the load platform 12. Using known technology in the art, a load cell (not shown) may be mounted in the load platform 12 so that a rocker pin (not shown) and receiver (not shown) can act through an aperture 36 in the plate 34 to impose strain on the load cell, but only when the floor scale 10 is in the operative position. As the frame 18 is raised, the receiver loses its contact with the floor and ceases to act on the load cell, although the weight of the load platform still bears upon the plate 34.

The various views depict several features of the pair of side frame members 24. Whereas the front and rear frame members 20, 22 are depicted as single cylindrical bars, or, as noted, cylindrical tubes, each side frame member 24 comprises a plurality of cylindrical bars or tubes, as well as a vertical plate 38. The arrangement of the cylindrical bars or tubes is intended at providing a rigid vertical truss having a light weight, with structural members that are easily cleaned and which do not provide concave horizontal surfaces that would allow liquids to accumulate.

Figure 4:
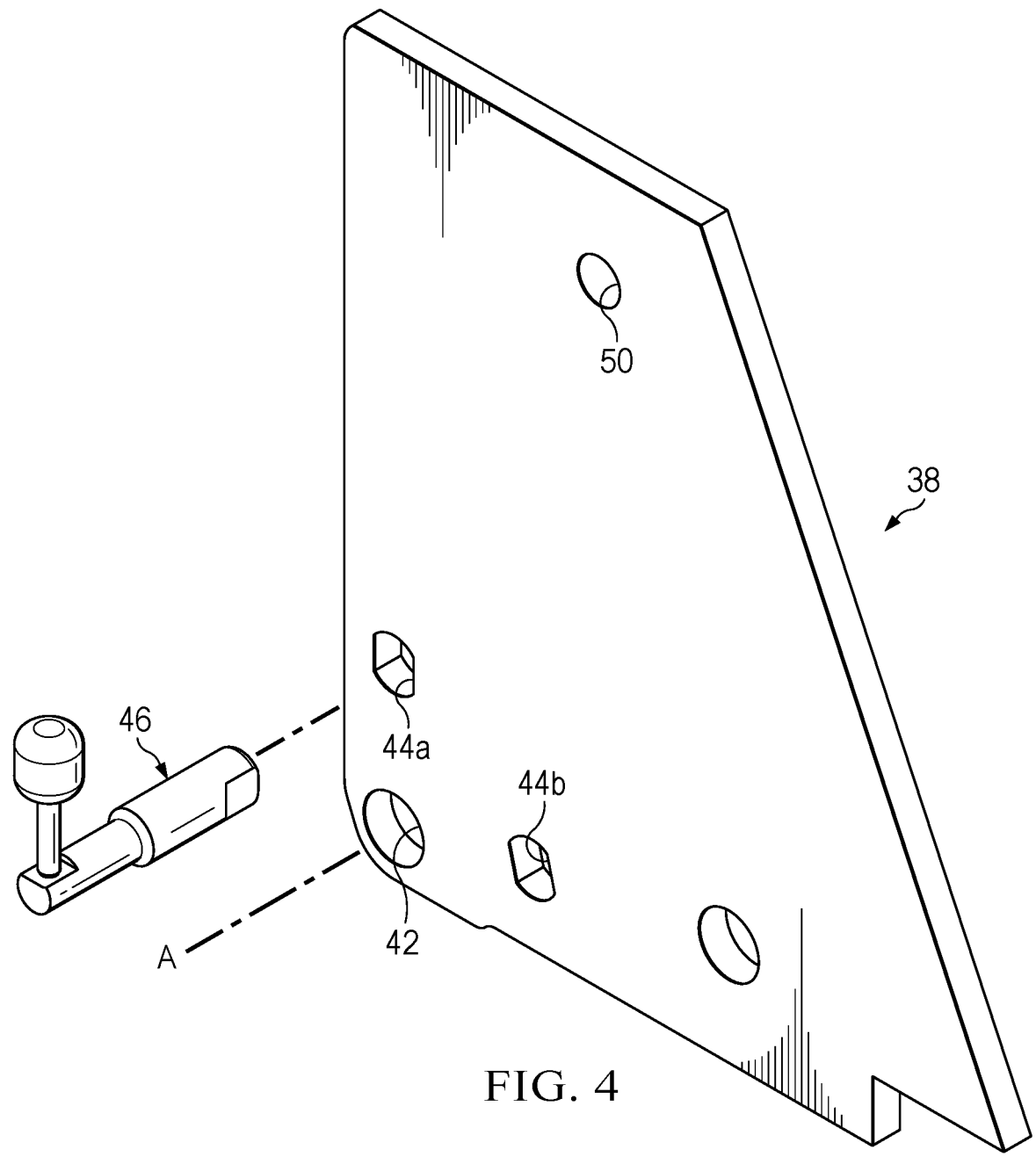
FIG. 4 is an enlarged perspective view of a vertical plate of each side frame member.

A vertical enlargement of each side frame member 24 may be achieved with the use of a vertical plate 38, as seen not only in FIGS. 3A and 3B, but also in FIG. 4. The vertical plate 38 is an important aspect of providing the pivoting movement of the frame 18 relative to the foot assemblies 26. The axis A for the pivoting movement is preferably provided by the rear frame member 22 or an extension thereof. An aperture 40 in the first foot of each foot assembly 26 receives an end of the rear frame member 22. Vertical plate 38 is shown as having a corresponding aperture 42, although an alternative solution would be to substitute a trunnion that protrudes horizontally into aperture 40 to establish the axis A. In many embodiments of the inventive concept, at least two further apertures 44 are provided in the vertical plate 38. A first of these, denominated 44a in FIG. 4, is vertically above axis A, represents a hole for receiving a locking pin 46 when the load platform is in the operative position. There should be at least one further aperture, denominated 44b, for receiving the locking pin 46 when the load platform is in at least one raised non-operative position. These apertures 44a, 44b will be; located along an arc at a selected radius R from the axis A. A locking pin 46 would preferably be located in a vertical extension of the first foot 28 and would preferably be spring-loaded to bias the pin into the apertures 44 as encountered during the pivoting movement of the frame 18.

In moving the frame 18 between the operative and non-operative positions, it is highly desirable to apply torque to the frame above the axis A. It is also desirable to be able to use a means 60 for applying torque to slow the return to the operative position from the raised non-operative position. A first point 48 for anchoring such a means for applying torque would be preferably located on the second foot 30. A second point 50 for anchoring would preferably be located high on the vertical plate 38. These anchor points 48, 50 may be provided by an aperture or a protruding pin. In some instances, the basic floor scale 10 will be provided without the means for applying torque, which may be determined by the user. In FIGS. 3A and 3B show a hydraulic cylinder installed as the means 60 for applying torque. There are several other options available to control the up and down motion of the load platform, including a gas spring cylinder, and a spring-loaded cylinder driven by a servo motor.

REFERENCE NUMERALS 10 floor scale
12 load platform
14 upper surface of the load platform
16 lower surface of the load platform
18 frame
20 front frame member
22 rear frame member
24 side frame member
26 foot assemblies
28 first foot
30 second foot
32 cylindrical bar
34 corner plate of frame
36 aperture of corner plate
38 vertical plate of side frame member
40 aperture in first foot to receive rear frame member or trunnion
42 aperture through vertical plate or trunnion
44a first aperture in vertical plate for locking pin
44b second aperture in vertical plate for locking pin
46 locking pin
48 anchor point
50 anchor point
60 means for applying torque
A axis for pivoting the load platform and frame
F footprint of the floor scale on the floor

What is claimed is:

1. A floor scale, configured to allow cleaning of both the floor scale and a footprint of the floor scale on a floor on which the floor scale is arranged, comprising:
    a load platform having an upper surface for receiving a load to be weighed;
    a frame supporting the load platform above the floor; and
    a pair of foot assemblies, each of which is connected to the frame for pivoting the load platform about an axis between an operative position in which the upper surface is substantially parallel to the floor and a non-operative position in which the upper surface is angled obliquely relative to the floor;
    wherein the frame comprises:
        a front frame member;
        a rear frame member;
        a pair of side frame members, each of which is attached to the respective front and rear frame members to define a rectangular frame having front, rear and side edges and four corners; and
        a plate, at a lower portion of each of the four corners, upon which the load platform bears.

2. The floor scale of claim 1, wherein the load platform is rectangular.

3. The floor scale of claim 2, wherein the load platform comprises a rectangular solid wherein the upper surface has an area of from 400 to 5000 in$^2$ and the load platform weighs from 120 to 600 lb.

4. The floor scale of claim 2, wherein
    the plate, at a lower portion of each of the four corners, has an aperture establishing a force communication with the floor only when the load platform is in the operative position; and
    the front and rear frame members comprise cylindrical bars and the side frame members comprise cylindrical bars and vertical plates, thereby minimizing concave horizontal surfaces that would allow accumulation of liquids.

5. The floor scale of claim 4, wherein each of the foot assemblies comprises:
    a first foot, connected to the frame near the rear edge of the frame, establishing the axis for pivoting the frame;
    a second foot, spaced apart from the first foot; and a cylindrical bar, offset from the floor and parallel to the side edge of the frame, holding the first foot and the second foot in fixed spaced-apart relationship.

6. The floor scale of claim 5, wherein:

each first foot and second foot is adapted to be anchored to the floor by a means for fastening.

7. The floor scale of claim 5, wherein, for each of the floor assemblies:

the second foot and the corresponding side frame member provide anchor points for applying torque to the frame above the axis.

8. The floor scale of claim 1, further comprising:

a means for locking the load platform in the operative position and in at least one non-operative position.

9. The floor scale of claim 8, wherein the means for locking comprises:

a spring-loaded locking pin arranged in the first foot; and at least two apertures in the corresponding side frame member, the first of the apertures positioned to receive the locking pin when the load platform is in the operative position and each of the further apertures positioned to receive the locking pin when the load platform is in one of the at least one non-operative positions.

10. The floor scale of claim 6, further comprising:

for each floor assembly, a hydraulic cylinder having a first end mounted to the second foot and a second end mounted to the corresponding side frame member.

11. The floor scale of claim 9, wherein:

a rod/piston of the hydraulic cylinder is in a retracted position when the load platform is in the operative position and in an extended position when the load platform is in the non-operative position.

12. The floor scale of claim 9 wherein a cylinder body of the hydraulic cylinder is mounted to the second foot.

13. The floor scale of claim 1, wherein all surfaces of the frame and foot assemblies are devoid of concave horizontal surfaces.

14. The floor scale of claim 1, wherein the rectangular frame having front, rear and side edges and four corners is an empty frame.

15. The floor scale of claim 1, wherein the frame comprises four plates upon which the load platform bears by comprising a plate, at a lower portion of each of the four corners, upon which the load platform bears.

16. The floor scale of claim 1, wherein the frame surrounds a periphery of the load platform.

17. The floor scale of claim 16, wherein the frame completely surrounds the periphery of the load platform.

18. The floor scale of claim 16, wherein the frame surrounds the periphery of the load platform with a distance.

* * * * *